United States Patent [19]

Yoshida

[11] Patent Number: 4,947,661
[45] Date of Patent: Aug. 14, 1990

[54] DETACHABLE TYPE CARBORNE ELECTRONIC APPARATUS

[75] Inventor: Tomoji Yoshida, Tokyo, Japan

[73] Assignee: Clarion Co., Ltd., Tokyo, Japan

[21] Appl. No.: 260,538

[22] Filed: Oct. 20, 1988

[30] Foreign Application Priority Data

Oct. 21, 1987 [JP] Japan .......................... 62-161058[U]

[51] Int. Cl.⁵ .......................... E05B 65/00; G12B 9/00
[52] U.S. Cl. .......................... 70/57; 292/126;
292/226; 312/7.1; 248/27.1; 248/27.3; 248/551
[58] Field of Search ............. 70/57, 58, 207, 209–211,
70/224; 292/29, 52, 108, 210, 100, 118, 126,
200, 217, 226, DIG. 30; 248/27.1, 27.3, 201,
551; 455/89, 90, 345–348; 312/7.1

[56] References Cited

U.S. PATENT DOCUMENTS

| | | | |
|---|---|---|---|
| 882,296 | 3/1908 | Carroll | 292/DIG. 30 X |
| 1,549,422 | 8/1925 | Mohun et al. | 292/100 |
| 1,581,055 | 4/1926 | Gnehm | 292/100 |
| 1,721,016 | 7/1929 | Gaskins | 292/226 |
| 2,010,492 | 8/1935 | Karre | 292/126 |
| 2,028,954 | 1/1936 | Roedding | 292/126 |
| 2,556,821 | 6/1951 | Rameson | 292/126 |
| 3,352,586 | 11/1967 | Hakanson | 292/227 X |
| 3,901,541 | 8/1975 | Peterson | 292/100 |
| 4,032,204 | 6/1977 | Nation | 455/347 X |
| 4,378,099 | 3/1983 | Ikeda et al. | 248/27.3 |
| 4,577,818 | 3/1986 | Clarisse | 248/27.3 |
| 4,623,110 | 11/1986 | Kanari | 248/27.1 |
| 4,679,026 | 7/1987 | Knakowski et al. | 455/346 X |
| 4,687,172 | 8/1987 | Stillback | 248/27.1 X |
| 4,726,632 | 2/1988 | Pori | 312/7.1 |
| 4,784,357 | 11/1988 | Kimura | 248/27.1 |
| 4,784,361 | 11/1988 | Kobayashi et al. | 248/27.3 X |
| 4,829,595 | 5/1989 | Kobayashi et al. | 312/7.1 X |

*Primary Examiner*—Robert L. Wolfe
*Assistant Examiner*—Suzanne L. Dino
*Attorney, Agent, or Firm*—Flynn, Thiel, Boutell & Tanis

[57] ABSTRACT

Disclosed is a detachable type carborne electronic apparatus equipped with a rotatable handle, which can be used both in carrying the electronic apparatus and in locking and unlocking the electronic apparatus from the car body. Specifically after being pushed in the dashboard, the electronic apparatus can be locked by rotating and lowering its handle. The electronic apparatus can be unlocked by rotating and raising its handle, and then the electronic apparatus is ready for withdrawal from the dashboard.

7 Claims, 4 Drawing Sheets

FIG. 8
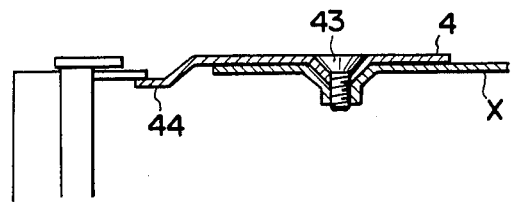
FIG. 9
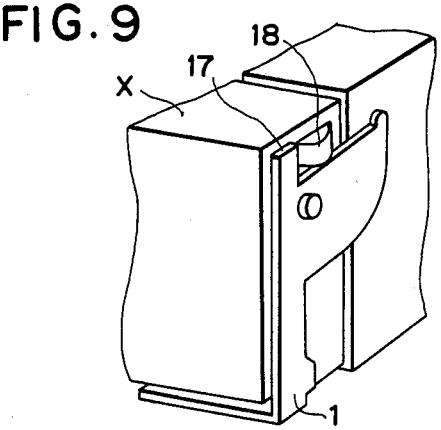
FIG. 10A  FIG. 10B
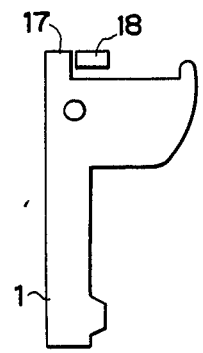 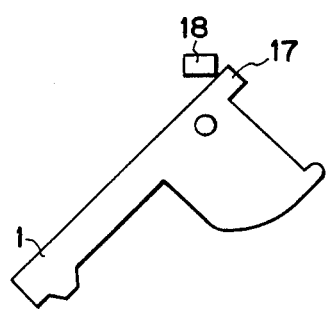

DETACHABLE TYPE CARBORNE ELECTRONIC APPARATUS

BACKGROUND OF THE INVENTION

The present invention relates to a detachable type carborne electronic apparatus, and more particularly a detachable type carbone electronic apparatus equipped with a handle which can be used in removing the apparatus from the car body and carrying the same.

DESCRIPTION OF THE PRIOR ART

Usually a carborne stereo or radio is fixed to the dashboard or console of a car. Recently detachable type carborne electronic apparatus have been increasingly popular from the point of antitheft view. These detachable type carborne electronic apparatus can be removed from the dashboard or console of a car, and can be carried. Such detachable type carborne electronic apparatus, however, are easily slipped off from the dashboard at the time of a sudden stop or rear-end collision. Some detectable type carborne electronic apparatus are equipped with means to prevent the slipping-off of the apparatus from the dashboard. These apparatus can be automatically fixed to the car body simply by pushing the apparatus in the dashboard, but when removed from the car, a special tool must be used, or otherwise, an associated release button is pushed, and then the apparatus is pulled out from the dashboard. In an attempt to facilitate removal of the apparatus from the dashboard, a carborne electronic apparatus is equipped with a rotatable latch-handle. This latch-handle requires unlatching operation and subsequent handle-raising operation before removal of the apparatus from the dashboard. This double action is not convenient to quich removal of the apparatus.

SUMMARY OF THE INVENTION:

One object of the present invention is to provide a detachable type carborne electronic apparatus which permits quick and easy removal from the dashboard.

To attain this object a detachable type carborne electronic apparatus according to the present invention comprises: a stationary bracket fixed to a car body ; an apparatus body which is adapted to slidably fit in the bracket; a handle extending across the front of the apparatus body and rotatably fixed to the opposite sides of the apparatus body, permitting the pivotal motion of the handle between the rising position in which the handle is laid across the front of the apparatus body and the lowering position in which the handle is laid across the lower front edge of the apparatus body; and a catch lever rotatably fixed to at least one side of the apparatus body, permitting the pivotal motion of the catch lever between the releasing position in which the apparatus body can be detached from the car body and the locking position in which the apparatus body is fixed to the car body, and the catch lever being responsive to the rising position of the handle to rotate to the releasing position, and being responsive to the lowering position of the handle to rotate to the locking position. Other objects and advantages of the present invention will be understood from the following description of preferred embodiments, which are shown in the accompanying drawings:

FIG. 8 shows how the base plate of the handle is fixed to the apparatus body;

FIG. 9 is a perspective view of the main part of a second embodiment of the present invention; and FIG. 10 shows how the handle is rotated in the second embodiment.

Figure 1:
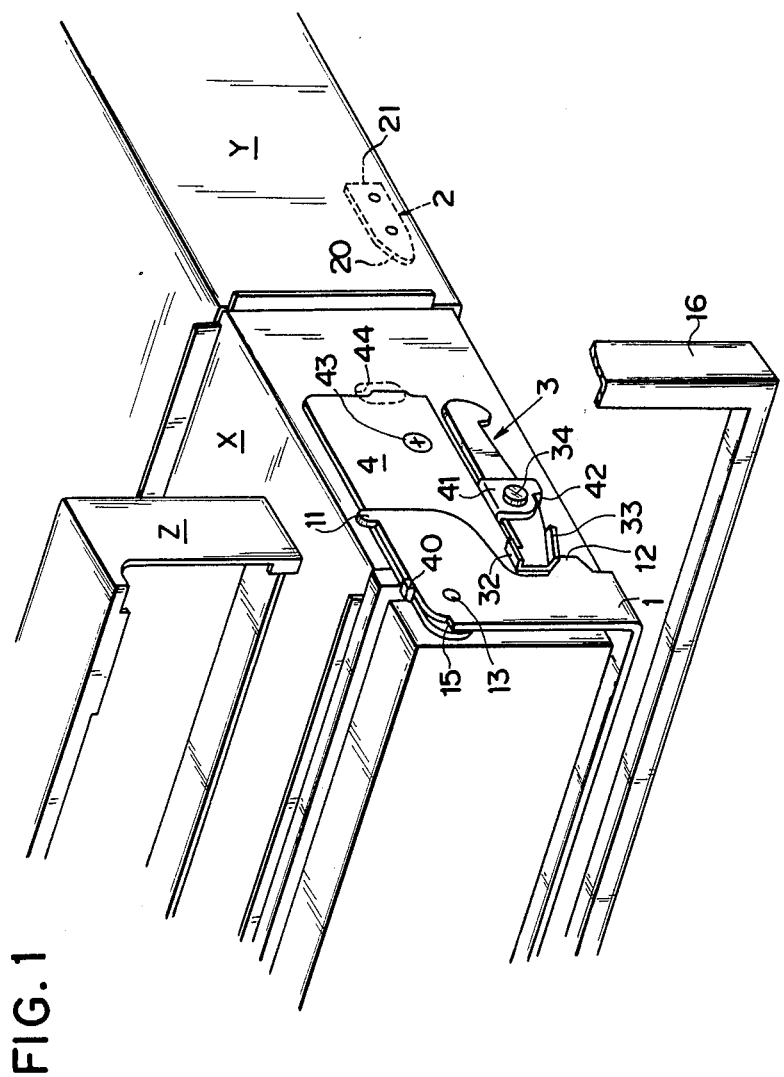
FIG. 1 is a perspective view of the main part of a detachable type carborne electronic apparatus according to a first embodiment of the present invention.
Figure 2:
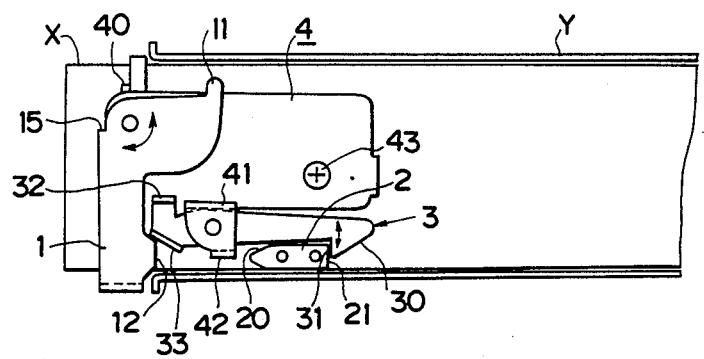
FIG. 2 is a side view of the carborne electronic apparatus, showing the locking position.
Figure 3:
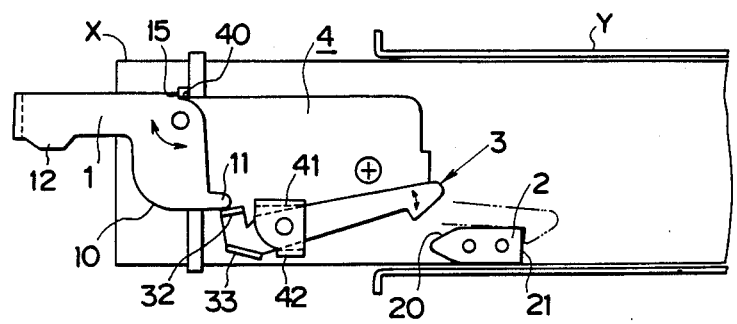
FIG. 3 is a side view of the carborne electronic apparatus, showing the releasing position.

Referring to FIGS. 1 to 3, there is shown a detachable type carborne electronic apparatus according to a first embodiment of the present invention. Specifically, FIG. 1 is a perspective view of the detachable type carborne electronic apparatus, and FIGS. 2 and 3 are side views of the apparatus.

As seen from these drawings, the apparatus body X is adapted to fit in a bracket Y, which is fixed to the car body. The "U"-shaped handle 1 is rotatably fixed to the electronic apparatus at its opposite side extensions. The apparatus can be detachably fitted in the bracket by using the handle 1. Also, the apparatus can be carried by holding this handle 1. As shown in FIG. 1, the handle 1 can be laid along the lower edge of the front of the apparatus while the apparatus is put in position. The handle 1 can be rotated towards a person, and be raised until it is laid across the front of the apparatus. Then, the apparatus is ready for withdrawal from the bracket. The handle 1 can be rotated between the lowering position or received position and the rising position. The opposite side extensions of the handle 1 are rotatably fixed to the apparatus body X via associated base plates 4.

A catch lever 3 is rotatably fixed to the base plate 4 on each side of the apparatus, and a counter catch plate or engaging projection 2 is fixed to each opposite inside of the bracket Y.

Figure 6:
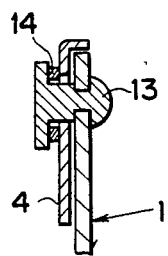
FIG. 6 shows how the handle is journaled.

As shown in FIG. 6, the handle 1 is adapted to rotate about its pivot 13 on each side of the apparatus body. The pivot 13 has a wavy washer 14 between the base plate 4 and the apparatus body X, thereby causing resistance to the force which is applied to the handle to rotate and permitting the yield rotation of when a somewhat strong forces is applied to the handle 1.

Therefore, undesired rotation of the handle 1 which is due to the vibration of the car while running in the normal condition, will be prevented.

Figure 4:
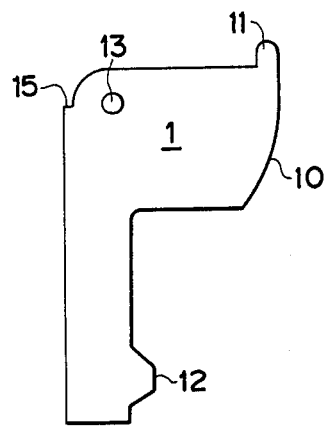
FIG. 4 is a side view of one side extension of a handle.

As shown in FIG. 4, the side extension of the handle 1 is in the form of "L", composed of lateral and longitudinal legs. The lateral leg has an unlatching side 10 and a second pushing part 11 which is consecutive to the unlatching side 10. Also, the longitudinal leg has a first pushing part 12 formed at its free end. The functions of these parts will be described later in detail.

Also, a handle-rotation stop 15 is formed at the outer corner of the L-shaped piece, and a counter handle-rotation stop 40 is formed on the front upper edge of the base 4. With this arrangement the rotation of the handle is limited to about 90° degrees.

Figure 7:
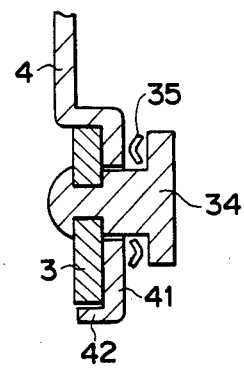
FIG. 7 shows how the catch lever is journaled.

The base plate 4 has a bulge 41, and a catch lever 3 is rotatably fixed to the bulge 41 of the base plate 4. The catch lever 3 is rectangular, and is pivoted to the base plate 4 at its center. As shown in FIG. 7, the catch lever 3 is rotatably fixed to the bulge 41 of the base plate 4 by a pivot pin 34 with a wavy washer 35 between the head of the pin 34 and the bulge 41. The wavy washer 35 causes a resistance to the rotation of the catch lever 3, and therefore, the catch lever 3 cannot rotate unless a somewhat strong force is applied to the catch lever 3.

As shown in FIG. 7, the bulge 41 has an inward bent portion on its lower edge. This inward bent portion functions as a lever-stop 42, thereby limiting the rotation of the catch lever 3 to a predetermined angle with respect to the horizontal position. In this particular embodiment the catch lever 3 can be raised about 10° degrees with respect to the horizontal position.

Figure 5:
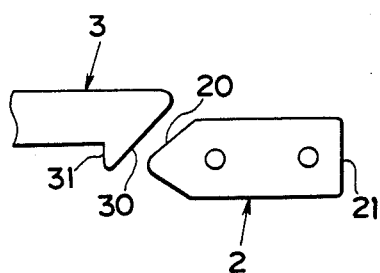
FIG. 5 shows a catch lever and a counter catch plate.

As shown in FIGS. 2, 3 and 5, the catch lever 3 has a hook formed at its rear end. The hook is composed of a slant 30 and a rise 31. A counter catch plate 2 is fixed to the inside of the bracket Y. The counter catch plate 2 has a slant 20 and a vertical side 21. The slant 20 of the counter catch plate 2 is adapted to cooperate with the slant 30 of the catch lever 3, and the vertical side 21 of the counter catch plate 2 is adapted to cooperate with the rise 31 of the catch lever 3.

The catch lever 3 has a second pushed part 32 formed on its upper front edge and a first pushed part 33 formed on its lower front edge. These pushed parts are formed by bending the corresponding edge portions. In operation the rise of the handle 1 will cause its second pushing part 11 to push the second pushed part 32 of the catch lever 3, thereby rotating the catch lever 3 about its pivot to raise its rear hook end apart from the vertical side 21 of the counter catch plate 2. Thus, the detachable electronic apparatus is put in the releasing position. The lowering of the handle 1 will cause its first pushing part 12 to push the first pushed part 33 of the catch lever 3, thereby rotating the catch lever 3 about its pivot to lower its rear hook end until it is caught by the vertical side 21 of the counter catch plate 2. Thus, the detachable electronic apparatus is put in the latching position.

The handle 1 and the catch lever 3 are rotatably fixed at such a position that the first pushing part 12 of the handle 1 may push the first pushed part 33 of the catch lever 3 when the handle 1 is rotated to the lowering position. The first pushing part 12 of the handle 1 has a slant surface, and likewise, the first pushed part 33 of the catch lever 3 has a slant surface. The slant angle of the first pushing and pushed part 12 and 33 with respect to the direction in which these parts come close to each other, is determined so as to apply a componential force to the catch lever to rotate it about its pivot. In this particular embodiment each of pushing and pushed parts has a slant surface, but either one may have a slant surface.

As shown in FIG. 8, a bent nail 44 projecting from the front end of the base plate 4 is inserted into a slot of the casing, and at the same time, the base plate 4 is fixed to the electronic apparatus body X by a flat-headed bolt 43.

The detachable type carborne electronic apparatus described above has a latching mechanism (composed of a catch lever 3, a counter catch plate 2, first and second pushing parts 11 and 12 etc.) on each side, but it can be provided to one side of the electronic apparatus if occasions demand. In FIG. 1 a handle cover is indicated at 16, and an exterior escutcheon is indicated by "Z".

It is possible to prevent undesired rotation and rise of the handle 1 from the lowering position when unintentional force is applied to the handle 1. FIG. 9 shows a spring-biased stop 18 appearing on each side of the electronic apparatus body. As shown, a nail projection 17 is provided to the lateral edge of each side extension of the handle 1. As shown in FIG. 10A, the nail 17 is caught by the stop 18 to prevent the rotation and rise of the handle 1 against a relatively weak force if applied to the handle 1. When a relatively strong force is applied to the handle 1, the handle pushes the spring-biased stop to cause it to yieldingly withdraw, thereby allowing the handle 1 to rotate and rise, as shown in FIG. 10B.

The manner in which the detachable type electronic apparatus is used, is described below.

The electronic apparatus is carried by its handle, and it is pushed in the bracket Y with its handle 1 pulled up towards the person. Then, the first pushed part 33 of the catch lever 3 is free from the first pushing part 12 of the handle 1. As the electronic apparatus body X is pushed forward, the slant surface 30 of the rear end of the catch lever 3 gets close to the slant surface 20 of the counter catch plate 2 to climb the slant surface 20. When the electronic apparatus body X is fully pushed in the bracket Y, the handle 1 is rotated and lowered until the handle 1 is laid across the lower front edge of the electronic apparatus. Then, the first pushing part 12 of the side extension of the handle 1 is put in contact with the first pushed part 33 of the front end of the catch lever 3 to raise the first pushed part 33 and hence lower the rear hook end of the catch lever 3 until the rise 31 is caught by the vertical side 21 of the counter catch plate 2, as shown in FIG. 2. Thus, the electronic apparatus is completely locked. The use of the wavy washer 35 assures that the rotation of the catch lever 3 is prevented against a relatively weak force if applied, and therefore no undesired unlatching can be caused. Also, the use of the wavy washer 14 assures that the rotation of the handle 1 is prevented unless a force which is stronger than a predetermined force is applied, and therefore no undesired rotation of the handle and hence undesired unlatching can be caused by shock or vibration.

The use of the latch unit as shown in FIG. 9 assures that the handle 1 is held in the lowering position without a fear of rising-and-unlocking due to incidental shock or vibration.

When it is desired to remove the electronic apparatus from the bracket, the handle 1 is rotated to rise, and then each side extension of the handle is accordingly rotated to cause its unlatching side 10 and second pushing part 11 to push the second pushed part 32 of the front end of the catch lever 3, thereby raising the rear end of the catch lever 3 to release its rise 31 from the vertical side 21 of the counter catch plate 2. Thus, the electronic apparatus is ready for withdrawal from the bracket.

As described above, the electronic apparatus can be locked to or unlocked from the car body simply by pushing down or pulling up the handle. The electronic apparatus is firmly locked unless the handle is rotated and raised, thus preventing the slipping-off of the electronic apparatus from the dashboard even if the electronic apparatus should be subjected to a relatively strong shock. Conveniently the locking and unlocking can be completed simply by lowering and raising the handle, not requiring any extra operation or tool for locking and unlocking. The handle in the lowering position has a positive effect to keep the catch lever engaged with the counter catch plate whereas the handle in the rising position has a positive effect to keep the catch lever released from the counter catch plate. These positive effects are caused by selective handle rotation, which is much more reliable action than resilient action caused, for instance by springs.

I claim:

1. A detachable type carborne electronic apparatus comprising:

a bracket fixed to a car and having a side wall;

an engaging projection provided on an inner surface of said side wall of said bracket;

an apparatus body which can be slidably inserted into and removed from said bracket, and which has a side surface corresponding to said side wall of said bracket;

a handle located near a front surface of said apparatus body and supported for pivotal movement about a first pivot axis between a received position in which the handle is received along a peripheral portion of said apparatus body and a rising position in which the handle extends to the front of the apparatus body, said handle having a grip portion, and having a first pushing part provided near said grip portion with respect to said first pivot axis and a second pushing part provided on an opposite side of said first pivot axis from said grip portion; and a catch lever having a hook portion and supported on said side surface of said apparatus body for pivotal movement about a second pivot axis between a catch position in which said hook portion engages a rear end of said engaging projection to releasably fix said apparatus body to the car and a release position in which said hook portion is free of engagement with said rear end of said engaging projection, said catch lever having opposed first and second pushed parts at respective positions thereon near said handle with respect to said second pivot axis and having said hook portion on a side of said second pivot axis opposite from said handle, said catch lever being forcibly maintained at said catch position by pushing motion of said first pushing part on said first pushed part when said handle is located at said received position, and being forcibly maintained at said release position by pushing motion of said second pushing part on said second pushed part when said handle is located at said rising position.

2. A detachable type carborne electronic apparatus according to claim 1, wherein said first and second pushing parts are spaced from said first pivot axis in respective directions which form approximately a right angle with respect to each other.

3. A detachable type carborne electronic apparatus according to claim 1, wherein said first pushing part is a projection.

4. A detachable type carborne electronic apparatus according to claim 1, wherein at least one of said first pushing part and said first pushed part has a slant surface which is engageable with the other thereof and which extends substantially perpendicular to a direction in which said first pushing part moves into contact with said first pushed part.

5. A detachable type carborne electronic apparatus according to claim 1, wherein at least one of said first pushing part and said first pushed part has a bent expanded area, and at least one of said second pushing part and said second pushed part has a bent expanded area.

6. A detachable type carborne electronic apparatus according to claim 1, wherein said handle is pivotally supported by a journal which has sufficient frictional resistance to prevent rotation of said handle in response to ordinary vibration of the car.

7. A detachable type carborne electronic apparatus according to claim 1, wherein said handle has means for preventing undesired pivotal motion of said handle from said received position to said rising position when a relatively weak force is applied to said handle.

* * * * *